United States Patent
Iarochenko

(10) Patent No.: US 9,912,008 B2
(45) Date of Patent: *Mar. 6, 2018

(54) ELECTRICAL ENERGY STORAGE DEVICE WITH NON-AQUEOUS ELECTROLYTE

(71) Applicant: Alexandre M. Iarochenko, Orillia (CA)

(72) Inventor: Alexandre M. Iarochenko, Orillia (CA)

(73) Assignee: Intec Energy Storage Corporation, Toronto (CA)

( * ) Notice: Subject to any disclaimer, the term of this patent is extended or adjusted under 35 U.S.C. 154(b) by 549 days.

This patent is subject to a terminal disclaimer.

(21) Appl. No.: 14/607,429

(22) Filed: Jan. 28, 2015

(65) Prior Publication Data
US 2015/0147663 A1 May 28, 2015

Related U.S. Application Data

(63) Continuation-in-part of application No. 14/539,448, filed on Nov. 12, 2014, now abandoned.

(Continued)

(51) Int. Cl.
*H01G 9/00* (2006.01)
*H01G 9/035* (2006.01)
(Continued)

(52) U.S. Cl.
CPC ........ *H01M 10/054* (2013.01); *H01G 9/0029* (2013.01); *H01G 9/035* (2013.01);
(Continued)

(58) Field of Classification Search
CPC ...... H01G 9/0029; H01G 9/035; H01G 9/045; H01M 10/054; H01M 10/0568;
(Continued)

(56) References Cited

U.S. PATENT DOCUMENTS 1,140,826 A 5/1915 Hoppie
1,920,151 A 7/1933 Ruben
(Continued)

FOREIGN PATENT DOCUMENTS

EP 0050441 A1 4/1982
EP 0118026 A1 9/1984
(Continued)

OTHER PUBLICATIONS

Lin, M.-C., et al. "An ultrafast rechargeable aluminum-ion battery", Nature, vol. 520, pp. 324-328, published Apr. 6, 2015.*
(Continued)

*Primary Examiner* — Miriam Stagg
*Assistant Examiner* — Lilia Nedialkova
(74) *Attorney, Agent, or Firm* — Dickinson Wright PLLC

(57) ABSTRACT

An electrical energy storage device 20 is disclosed as a secondary battery device 22 having an anode 28 containing Aluminum and Indium and a cathode 38 that includes an electroactive layer 42 with a host lattice 44 having a conjugated system with delocalized π electrons. A dopant 48 containing Aluminum is bonded with and intercalated in the host lattice 44. A membrane 34 of cellulose is wetted with a non-aqueous electrolyte 24 containing glycerol and first ions 26 containing Aluminum and having a positive charge and second ions 27 containing Aluminum and having a negative charge, and is sandwiched between the anode 28 and the cathode 38. A method for constructing a secondary battery device 22 is disclosed as well, including steps for producing the electrolyte 24, the anode 28, and the cathode 38 including the dopant 48.

22 Claims, 2 Drawing Sheets

Related U.S. Application Data

(60) Provisional application No. 61/903,145, filed on Nov. 12, 2013.

(51) Int. Cl.

| | | |
|---|---|---|
| *H01G 9/045* | (2006.01) | |
| *H01M 10/054* | (2010.01) | |
| *H01M 10/0568* | (2010.01) | |
| *H01M 10/0569* | (2010.01) | |
| *H01M 10/0585* | (2010.01) | |
| *H01M 2/16* | (2006.01) | |
| *H01M 2/26* | (2006.01) | |
| *H01M 4/133* | (2010.01) | |
| *H01M 4/46* | (2006.01) | |
| *H01M 4/62* | (2006.01) | |
| *H01M 4/66* | (2006.01) | |
| *H01M 4/583* | (2010.01) | |
| *H01M 4/134* | (2010.01) | |
| *H01M 4/137* | (2010.01) | |
| *H01M 4/38* | (2006.01) | |
| *H01M 4/60* | (2006.01) | |
| *H01M 4/50* | (2010.01) | |
| *H01M 12/00* | (2006.01) | |

(52) U.S. Cl.
CPC .......... *H01G 9/045* (2013.01); *H01M 2/1626* (2013.01); *H01M 2/26* (2013.01); *H01M 4/133* (2013.01); *H01M 4/134* (2013.01); *H01M 4/137* (2013.01); *H01M 4/38* (2013.01); *H01M 4/463* (2013.01); *H01M 4/583* (2013.01); *H01M 4/606* (2013.01); *H01M 4/625* (2013.01); *H01M 10/0568* (2013.01); *H01M 10/0569* (2013.01); *H01M 10/0585* (2013.01); *H01M 4/502* (2013.01); *H01M 4/62* (2013.01); *H01M 12/005* (2013.01); *H01M 2300/0028* (2013.01); *Y02T 10/7022* (2013.01); *Y10T 29/49108* (2015.01)

(58) Field of Classification Search
CPC ......... H01M 10/0569; H01M 10/0585; H01M 12/005; H01M 2300/0028; H01M 2/1626; H01M 2/26; H01M 4/133; H01M 4/137; H01M 4/38; H01M 4/463; H01M 4/502; H01M 4/583; H01M 4/606; H01M 4/62; H01M 4/625; Y02T 10/7022; Y10T 29/49108

See application file for complete search history.

(56) References Cited

U.S. PATENT DOCUMENTS

| | | |
|---|---|---|
| 2,554,447 A | 5/1951 | Sargent |
| 2,838,591 A | 6/1958 | Stokes |
| 2,877,136 A | 3/1959 | Booth |
| 3,551,205 A | 12/1970 | Frraioli et al. |
| 3,632,448 A | 1/1972 | Beltzer |
| 4,064,327 A | 12/1977 | King et al. |
| 4,098,606 A | 7/1978 | Despic et al. |
| 4,463,072 A | 7/1984 | Gifford et al. |
| 4,497,883 A | 2/1985 | Murray |
| 4,820,595 A | 4/1989 | MacDiarmid et al. |
| 5,023,149 A | 6/1991 | MacDiarmid et al. |
| 5,457,599 A | 10/1995 | Kuwae et al. |
| 5,554,458 A | 9/1996 | Noda et al. |
| 6,117,585 A | 9/2000 | Anani et al. |
| 6,316,141 B1 | 11/2001 | Aurbach et al. |
| 6,355,369 B1 | 3/2002 | Iarochenko et al. |
| 6,372,371 B1 | 4/2002 | Iarochenko et al. |
| 6,409,905 B1 | 6/2002 | Melody et al. |
| 6,566,000 B1 | 5/2003 | Iarochenko et al. |
| 6,589,692 B2 | 7/2003 | Takami |
| 6,949,233 B2 | 9/2005 | Kweon et al. |
| 7,342,773 B2 | 3/2008 | Harrington et al. |
| 7,524,587 B2 | 4/2009 | Omote |
| 7,871,728 B2 | 1/2011 | Minami et al. |
| 7,940,027 B2 | 5/2011 | Desprez et al. |
| 8,062,788 B2 | 11/2011 | Issav et al. |
| 8,119,269 B2 | 2/2012 | Ramasubramanian et al. |
| 8,785,044 B2 | 7/2014 | Marple et al. |
| 2002/0148539 A1 | 10/2002 | Iarochenko et al. |
| 2003/0049508 A1 | 3/2003 | Iarochenko et al. |
| 2009/0142668 A1 | 6/2009 | Ishii |
| 2010/0119919 A1 | 5/2010 | Iarochenko et al. |
| 2012/0034531 A1 | 2/2012 | Senda et al. |
| 2012/0058380 A1 | 3/2012 | Wang et al. |
| 2012/0082904 A1 | 4/2012 | Brown et al. |
| 2013/0089769 A1 | 4/2013 | Proctor et al. |
| 2013/0209885 A1 | 8/2013 | Paulsen et al. |
| 2014/0087250 A1 | 3/2014 | Coowar et al. |
| 2014/0242457 A1 | 8/2014 | Archer et al. |
| 2015/0280279 A1* | 10/2015 | Nakayama .......... H01M 10/054 429/340 |

FOREIGN PATENT DOCUMENTS

| | | |
|---|---|---|
| GB | 1915-08204 | 4/1916 |
| JP | S63257183 A | 10/1988 |
| JP | H0652898 A | 2/1994 |
| JP | 2977252 B2 | 11/1999 |
| WO | 01/33658 A2 | 5/2001 |
| WO | 02/071513 A2 | 9/2002 |
| WO | 02/086984 A2 | 10/2002 |

OTHER PUBLICATIONS

Angell, M., et al. "High Coulombic efficiency aluminum-ion battery using an AlCl3-urea ionic liquid analog electrolyte", PNAS, vol. 114, pp. 834-839, published Jan. 31, 2017.*

Smith, E.L., et al. "Deep Eutectic Solvents and Their Applications", Chemical Reviews, vol. 114, pp. 11060-11082, published Oct. 10, 2014.*

Kukushkin et al. Metal-Mediated and Metal-Catalyzed Hydrolysis of Nitriles, Inorganica Chimica Acta vol. 358, Issue 1, pp. 1-21 (Published Nov. 25, 2004) [Abstract].

Jayaprakash et al. The Rechargeable Aluminum-Ion Battery. Chemical Communications, 2011, 47, 12610-12612 (Published Nov. 3, 2011).

Wang, W. et al. A New Cathode Material for Super-Valent Battery Based on Aluminium Ion Intercalation and Deintercalation. Scientific Reports 3, 3383; DOI:10.1038/srep03383 (Published Nov. 29, 2013).

Kukushkin et al. Additions to Metal-Activated Organonitriles, Chem. Rev., 2002, 102 (5), pp. 1771-1802 (2002) [Abstract].

* cited by examiner

ELECTRICAL ENERGY STORAGE DEVICE WITH NON-AQUEOUS ELECTROLYTE

CROSS REFERENCE TO RELATED APPLICATION

This application is a continuation-in-part of U.S. patent application Ser. No. 14/539,448 filed Nov. 12, 2014, which claims the benefit of provisional application Ser. No. 61/903,145 filed Nov. 12, 2013.

BACKGROUND OF THE INVENTION

1. Field of the Invention

This invention relates to electrical energy storage devices having an anode of Aluminum and an electrolyte containing ions of Aluminum.

This invention also relates to a method for constructing an electrical energy storage device having an anode of Aluminum and an electrolyte including ions containing Aluminum.

2. Description of the Prior Art

It is generally known to construct batteries with an anode comprising a layer of Aluminum. These Aluminum batteries typically take the form of primary, or non-rechargeable Aluminum-Air batteries, such as the type disclosed in U.S. Pat. No. 4,925,744. The use of Aluminum alloy with 0.1 to 0.5% by weight of Indium to make a thin film battery electrode is disclosed in US Patent Application Pub. No. 2002/0,148,539. US Patent Application 2012/0,082,904 discloses a battery that includes an anode comprising aluminum metal and an electrolyte including ions containing Aluminum.

It is also well known to construct batteries as a sandwich of layers, with a cathode sandwiched with the membrane and disposed in spaced and parallel relationship with the anode and an electrolyte impregnating the membrane to carry an ion current through the membrane. One such example is shown in US Patent Application 2009/0142668.

It is known to use a dopant to alter the electrochemical properties of a battery cathode. Such a doped cathode is disclosed in U.S. Pat. No. 6,949,233.

Existing energy storage devices with anodes of Aluminum have been constrained by corrosion and by the formation of oxides on the surface of the anode which blocks ions in the electrolyte from being able to react with the anode and inhibits such batteries from being discharged and recharged again.

SUMMARY OF THE INVENTION

The invention provides for an electrical energy storage device with an Anode containing Aluminum and a cathode including a host lattice having a conjugated system with delocalized $\pi$ electrons bonded with a dopant that contains Aluminum and an electrolyte with positive and negative ions of Aluminum dispersed in Glycerol. The invention also provides for a method of constructing such an electrical energy storage device including the step of making the electrolyte by dissolving Aluminum Perchlorate powder in Glycerol.

Advantages of the Invention

The invention in its broadest aspect provides for an electrical energy storage device that includes an anode of Aluminum and a novel electrolyte including ions containing Aluminum dispersed in Glycerol.

Because of its unique electrochemical properties, Aluminum offers the potential for much greater energy density compared with other materials commonly used in electrical energy storage devices, such as in Lithium-Ion batteries. Aluminum offers further advantages in that it is abundant, inexpensive, and much less flammable than Lithium.

Glycerol, which is also called glycerine, glycerin, or propane-1,2,3-triol, is a simple polyol (sugar alcohol) having a molecular formula $C_3H_8O_3$. Glycerol is an abundant, stable, hygroscopic, and nontoxic solvent, ideal for use in a non-aqueous electrolyte. This electrolyte enables an Aluminum Secondary battery to be constructed with an anode of Aluminum which is capable of multiple charge and discharge cycles because it does not suffer from destructive corrosion or formation of oxides on the Aluminum in the anode.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
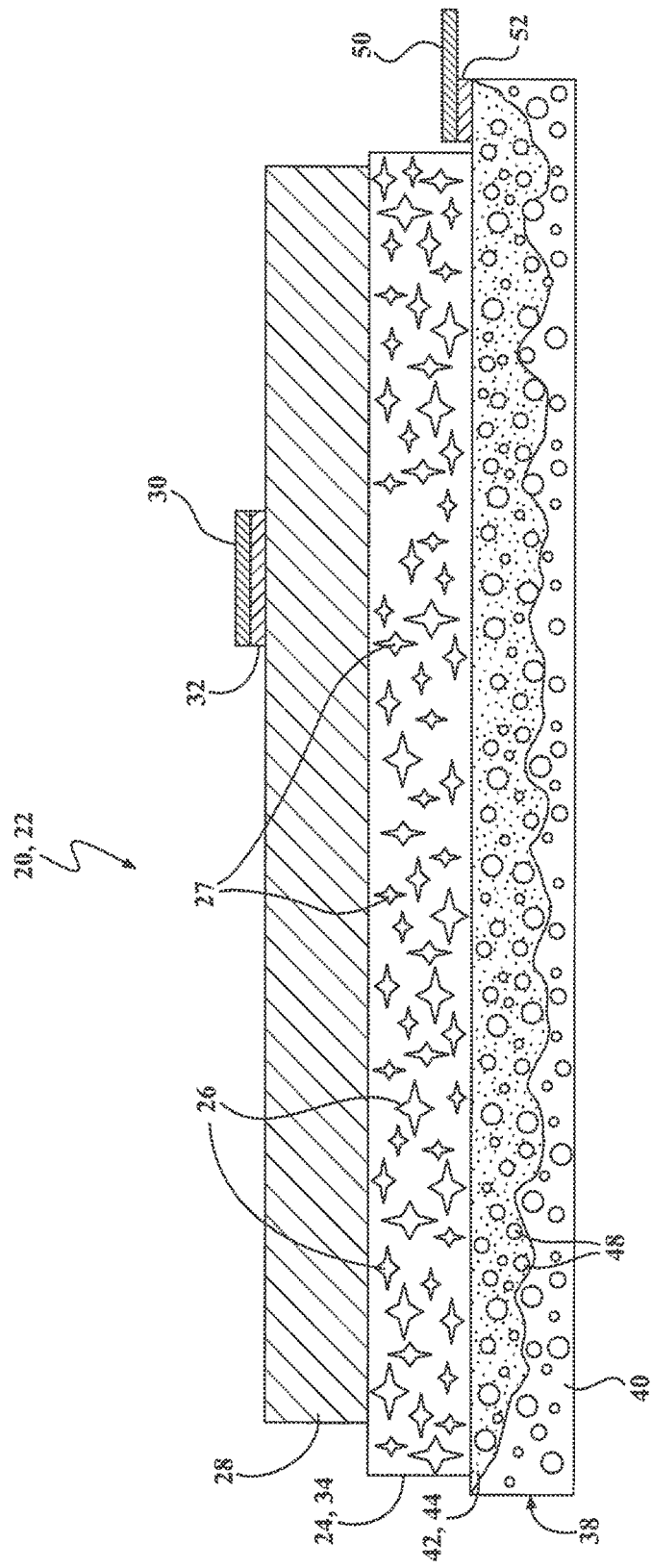
FIG. 1 is a schematic cut-away view of an Aluminum secondary battery.
Figure 2:
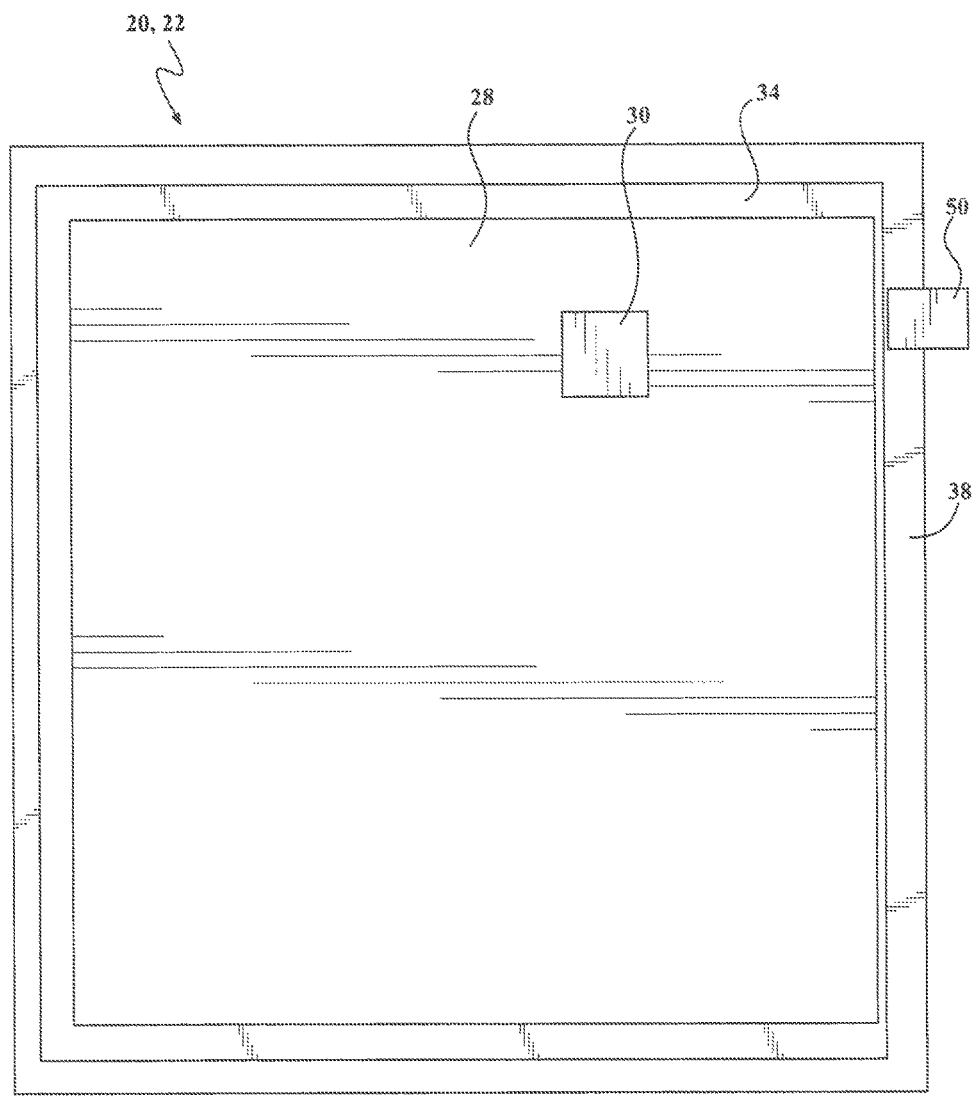
FIG. 2 is a top view of a secondary battery with an anode disposed above a cathode layer.

Referring to the Figures, wherein like numerals indicate corresponding parts throughout the several views, an electrical energy storage device 20 is disclosed as a secondary battery device 22 using a non-aqueous electrolyte 24 including ions 26, 27 containing Aluminum. The term "secondary battery" refers to an electrochemical energy storage device that is capable of being recharged. The term "non-aqueous" refers to a substance that contains no substantial quantity of water. Other types of electrical energy storage devices 20 may be constructed according to the present invention. Such electrical energy storage devices 20 include, for example, primary, or non-rechargeable batteries, and electrolytic capacitors.

As shown in the figures, the secondary battery device 22 is constructed as a stack of thin layers. It should be appreciated that the secondary battery device 22 could be made in numerous different physical arrangements. Examples of those arrangements are coin cells, cylindrical batteries, and multi-cell packages such as those that as are commonly used in laptop computers, personal electronics, and electric or hybrid-electric vehicles.

The secondary battery device 22 includes an anode 28 of Aluminum of 99.95% purity and 0.1 to 0.6 wt % of Indium. The Anode 28 has a rectangular shape with a first length of 1.2 cm and a first width of 1.7 cm and a first thickness of 0.1 mm.

A negative lead 30 of an electrically conductive material is attached in electrical contact with the anode 28 using an electrically conductive cement 32 that includes particles of metal. Examples of such electrically conductive cement 32 are Two Part Conductive Silver Paint (Part No. 12642-14), sold by Electron Microscopy Sciences and Solder-It Aluminum Solder Paste, sold by SOLDER-IT, INC. of Pleasantville, N.Y. The negative lead 30 serves as a point of connection to conduct electrical current between the anode 28 and an external circuit for charging or discharging the battery device. The negative lead 30 could also serve as a point of connection to another battery cell as part of a multi-cell battery device. The negative lead 30 could be a wire, pad, terminal, or any other suitable means of making an electrical connection.

A membrane 34 of cellulose having a thickness of 0.08 mm and defining a plurality of pores (not shown in the FIGS.) is sandwiched parallel to and contacting the anode 28. The membrane 34 is an electrical insulator, but is permeable to dissolved ions 26, 27.

The secondary battery device 22 also includes a cathode 38 having a rectangular shape with a second length of 1.4 cm and a second width of 1.9 cm and a second thickness of 0.1 mm. The cathode 38 is disposed adjacent and parallel to the membrane 34, with the membrane 34 sandwiched between the cathode 38 and the anode 28.

The cathode 38 includes a carrier sheet 40 of cellulose and an electroactive layer 42 disposed upon and integrated within the carrier sheet 40 on the side facing the anode 28. In other words, the electroactive layer 42 coats the surface and extends into the structure of the carrier sheet 40. The electroactive layer 42 contains a host lattice 44 that defines a plurality of voids and includes a conjugated system with delocalized $\pi$ electrons. A conjugated system is defined as a system of connected p-orbitals containing delocalized electrons in chemical compounds. More specifically, the conjugation is the overlapping of one p-orbital with another across adjacent single (sigma) bonds. One such compound that has such a conjugated system is graphite. Other compounds such as, but not limited to, polyaniline and polyconjugated linear hydrocarbon polymers also include the conjugated systems with overlapping p-orbitals. A dopant 48 that includes Aluminum Alcoholate and Aluminum Glycerate is bonded to the conjugated system of the host lattice 44 to alter the electrochemical properties of the electroactive layer 42 of the cathode 38 to increase the rate of the reactions with the first ions 26 and the second ions 27 for charging and discharging the secondary battery device 22. The dopant 48 is also intercalated in the host lattice 44 so that particles of the dopant 48 are embedded in the voids of the host lattice 44.

A positive lead 50 containing graphite is electrically connected to the electroactive layer 42 of the cathode 38 for conducting electrical current between the cathode 38 and an external circuit for charging or discharging the battery. The positive lead 50 is electrically and mechanically attached to the electroactive layer 42 of the cathode 38 with a conductive adhesive 52 containing graphite. One such conductive adhesive 52 is Graphite Conductive Adhesive 52 112 (Part No. 12693-30), sold by Electron Microscopy Sciences. The positive lead 50 is preferably made of a thin film strip of thermally expanded graphite. The positive lead 50 may also be a rod of graphite with a diameter of 0.1 mm. The positive lead 50 could also serve as a point of connection to another battery cell as part of a multi-cell battery device. The positive lead 50 could be constructed as a wire, pad, terminal, or any other suitable means of making an electrical connection. Conductors of metal should not be placed in direct contact with the electroactive layer 42 of the cathode 38 because some metals have been shown to migrate into the electroactive layer 42 and interfere with the functionality of the cathode 38 in charging and discharging the secondary battery device 22.

An electrolyte 24, consisting essentially of glycerol and first ions 26 containing Aluminum and having a positive charge, including $[Al(ClO_4)_2.\{C_3H_5(OH)_3\}_3]^+$ and second ions 27 containing Aluminum and having a negative Charge, including $[Al(ClO_4)_4]^-$, impregnates or soaks the pores of the membrane 34 for conveying the ions 26, 27 through the membrane 34. The ions 26, 27 of Aluminum thereby comprise an ion current as they migrate between and react with the anode 28 and the cathode 38 to charge and discharge the battery.

In one embodiment, the host lattice 44 of the electroactive layer 42 comprises flakes of graphite having particle size of 200 to 300 µm and a binder material that is wettable by glycerol. Alkyl glue and acrylic glue are each suitable binder materials, and either may be used.

In an alternative embodiment, the host lattice 44 of the electroactive layer 42 comprises particles of amorphous thermally expandable graphite and manganese dioxide and activated manganese dioxide and acetylene black and an electrically conductive paint including graphite and a binder material that is wettable by glycerol. Alkyl glue, acrylic glue, and conductive paint that includes graphite have each been found to be suitable binders.

In another alternative embodiment, the host lattice 44 of the electroactive layer 42 includes a polyconjugated linear hydrocarbon polymer.

In another alternative embodiment, the host lattice 44 of the electroactive layer 42 includes a cyclic polyconjugated chain polymer such as polyaniline.

The present invention also provides a method for constructing a secondary battery device 22.

The method includes the steps of making a foil by heating a plate of Aluminum of 99.95% purity and 0.1 to 0.6 wt % of Indium to a temperature of 450° C., rolling the plate to reduce the thickness of the plate while cooling at a rate of more than 10° C. per minute to a reduced thickness, reheating the reduced thickness of the plate and rerolling the reduced thickness of the plate into a foil coated with Aluminum Oxide and surface contaminants and having a thickness between 0.05 and 0.1 mm.

The method proceeds with steps for processing and storing the foil, which include: rinsing the foil with ethanol to remove surface contaminants therefrom, submerging the foil in a 4 mol solution of water and Hydroxide for one minute to remove any Aluminum Oxide from the surface of the foil, rinsing the foil with water to remove all Hydroxide therefrom, subjecting the foil to 70° C. for 30 minutes to evaporate any moisture from it, and storing the foil in an anhydrous environment to prevent oxidation.

The method continues with steps for making an anode 28 from the foil by dividing the foil into a rectangular shape to define the anode 28 having a first length of 1.2 cm and a first width of 1.7 cm, and attaching a negative lead 30 to the anode 28 with a cement 32 of silver paint or aluminum solder paste.

The method includes the steps of making a cathode 38 by applying the cathodic mixture in a thin film layer to one side of a carrier sheet 40 of cellulose to soak into the carrier sheet 40, subjecting the cathodic mixture to a temperature of 50 to 60° C. to solidify the cathodic mixture into a host lattice 44 that is disposed upon and within the carrier sheet 40, wetting the host lattice 44 with a doping fluid (not shown in the FIGS.) containing a dopant 48 to allow the dopant 48 to bond with and intercalate into the host lattice 44 to produce an electroactive layer 42, and attaching a positive lead 50 in electrical contact with the electroactive layer 42 of the cathode 38 with an adhesive 52 containing graphite.

The method includes the steps of making a cathode 38 by applying the cathodic mixture 60 in a thin film layer to one side of a carrier sheet 40 of cellulose to soak into the carrier sheet 40, subjecting the cathodic mixture 60 to a temperature of 50 to 60° C. to solidify the cathodic mixture 60 into a host lattice 44 that is disposed upon and within the carrier sheet 40, wetting the host lattice 44 with a doping fluid 62 containing a dopant 48 to allow the dopant 48 to bond with and intercalate into the host lattice 44 to produce an electroactive layer 42, and attaching a positive lead 50 in electrical contact with the electroactive layer 42 of the cathode 38 with an adhesive 52 containing graphite.

The method includes further steps for constructing the battery device by stacking the cathode 38 upon and parallel to the membrane 34 with the membrane 34 disposed between the anode 28 and the cathode 38.

The method includes steps for producing an electrolyte 24 by dissolving Aluminum Perchlorate powder in glycerol to saturation to produce the electrolyte 24.

The method also includes steps for producing the doping fluid by dissolving $AlCl_3$ powder in ethanol to saturation to produce a background solution (not shown in the FIGS.), combining 40 wt % of the background solution with 60 wt % of glycerol to produce a binary solvent (not shown in the FIGS.), grating 1 $cm^3$ of 99.4 to 99.9 wt % of Aluminum of 99.95% purity and 0.1 to 0.6 wt % of Indium to make filings (not shown in the FIGS.) with an equivalent surface area of 20 to 30 $cm^2$, immersing the filings in 150 to 200 ml of the binary solvent until the filings have dissolved to produce the doping fluid.

The present invention also provides a first method for making the cathodic mixture by mixing 5 wt % of alkyl glue with 60 wt % of ethanol with 35 wt % of flakes of graphite.

The present invention provides a second, alternative, method for making the cathodic mixture by mixing amorphous thermally expandable graphite powder with 1-5 wt % $MnO_2$ with 1-5 wt % activated $MnO_2$ with 1-5 wt % acetylene black to make an intermediate mixture, and adding a binder of alkyl glue and ethanol or acrylic glue or graphite paint to the intermediate mixture to make the cathodic mixture having a consistency of thick spreadable paste.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

ELEMENT LIST

| Element Symbol | Element Name |
| --- | --- |
| 20 | electrical energy storage device |
| 22 | secondary battery device |
| 24 | electrolyte |
| 26 | first ions |
| 27 | second ions |

-continued

| Element Symbol | Element Name |
| --- | --- |
| 28 | anode |
| 30 | negative lead |
| 32 | cement |
| 34 | membrane |
| 38 | cathode |
| 40 | carrier sheet |
| 42 | electroactive layer |
| 44 | host lattice |
| 48 | dopant |
| 50 | positive lead |
| 52 | adhesive |

What is claimed is:

1. An electrical energy storage device (20) comprising;
   an anode (28) comprising a layer of Aluminum,
   a membrane (34) sandwiched with said anode (28),
   an electrolyte (24) including first ions (26) containing Aluminum and having a positive charge and including second ions (27) containing Aluminum and having a negative charge and said electrolyte (24) impregnating said membrane (34) to carry an ion current through said membrane (34),
   a cathode (38) sandwiched with said membrane (34) and disposed in spaced and parallel relationship with said anode (28),
   and characterized by,
   said electrolyte (24) consisting essentially of glycerol and said first ions (26) containing Aluminum and said second ions (27) containing Aluminum dispersed in said glycerol for migrating between and reacting with said anode (28) of Aluminum and said cathode (38) to charge and discharge the electrical energy storage device (20).

2. An electrical energy storage device (20) as set forth in claim 1 wherein said first ions (26) containing Aluminum include $[Al(ClO_4)_2 \cdot \{C_3H_5(OH)_3\}_2]^+$ and said second ions (27) containing Aluminum include $[Al(ClO_4)_4]^-$.

3. A method for constructing the electrical energy storage device (20) of claim 1 having the anode (28) and the membrane (34) and the electrolyte (24) and the cathode (38), said method comprising;
   wetting the membrane (34) with the electrolyte (24),
   stacking the membrane (34) upon and parallel to the anode (28),
   stacking the cathode (38) upon and parallel to the membrane (34) with the membrane (34) disposed between the anode (28) and the cathode (38),
   and characterized by,
   dissolving Aluminum Perchlorate powder in glycerol to saturation to make the electrolyte (24).

4. The method as set forth in claim 3 further comprising steps for making a doping fluid for carrying a dopant (48) containing Aluminum into an electrode (28, 38) of an electrical energy storage device (20) using filings containing Aluminum, said method comprising;
   dissolving $AlCl_3$ powder in ethanol to create a background solution,
   and characterized by,
   combining the background solution with glycerol to produce a binary solvent,
   immersing the filings containing Aluminum in the binary solvent until the filings containing Aluminum have dissolved to produce the doping fluid.

5. An electrical energy storage device (20) comprising;
an anode (28) comprising a layer of Aluminum,
a membrane (34) sandwiched with said anode (28),
a cathode (38) sandwiched with said membrane (34) and disposed in spaced and parallel relationship with said anode (28),
and characterized by,
said cathode (38) containing a host lattice (44) having a conjugated system with delocalized π electrons and a dopant (48) containing Aluminum Glycerate bonded with said host lattice (44) to alter the electrochemical properties of said host lattice (44) of said cathode (38).

6. An electrical energy storage device (20) as set forth in claim 5 wherein said dopant (48) contains Aluminum Alcoholate.

7. A secondary battery device (22) comprising;
an anode (28) consisting of a layer of 99.4 wt % to 99.9 wt % of solid Aluminum of 99.95% purity and 0.1 wt % to 0.6 wt % of indium and having a rectangular shape with a first length of 1.2 cm and a first width of 1.7 cm and a first thickness of 0.1 mm,
a negative lead (30) of an electrically conductive material in electrical contact with said anode (28) for conducting electrical current with external circuitry,
a cement (32) including particles of metal disposed between and bonding said anode (28) and said negative lead (30) for conducting electrical current therebetween,
a membrane (34) of cellulose having a third thickness of 0.08 mm and defining a plurality of pores and sandwiched with said anode (28) for providing electrical insulation therebetween,
an electrolyte (24) including first ions (26) containing Aluminum and having a positive charge and including second ions (27) containing Aluminum and having a negative charge and said electrolyte (24) impregnating said pores of said membrane (34) to carry an ion current through said membrane (34),
a cathode (38) having a rectangular shape with a second length of 1.4 cm and a second width of 1.9 cm and a second thickness of 0.1 mm disposed adjacent and parallel to said membrane (34) with said membrane (34) being sandwiched between said cathode (38) and said anode (28),
said cathode (38) including a carrier sheet (40) of cellulose and an electroactive layer (42) integrated with and upon said carrier sheet (40) facing said anode (28),
a positive lead (50) containing graphite in electrical contact with said electroactive layer (42) of said cathode (38) for conducting electrical current with external circuitry,
an adhesive (52) containing graphite disposed between and bonding said electroactive layer (42) and said positive lead (50) for conducting electrical current therebetween,
and characterized by,
said electrolyte (24) consisting essentially of glycerol and said first ions (26) including $[Al(ClO_4)_2 \cdot \{C_3H_5(OH)_3\}_2]^+$ and said second ions (27) including $[Al(ClO_4)_4]^-$ for migrating between and reacting with said anode (28) and said cathode (38) to charge and discharge said secondary battery device (22),
said electroactive layer (42) of said cathode (38) containing a host lattice (44) having a conjugated system with delocalized π electrons and defining voids and a dopant (48) containing Aluminum Alcoholate and Aluminum Glycerate bonded with said conjugated system of said host lattice (44) and intercalated in said voids to alter the electrochemical properties of said electroactive layer (42) of said cathode (38) to increase the rate of the reactions with said first ions (26) and said second ions (27) for charging and discharging said secondary battery device (22).

8. The secondary battery device (22) as set forth in claim 7 wherein said host lattice (44) of said electroactive layer (42) comprises flakes of graphite having particle size of 200 μm to 300 μm and a binder material wettable by glycerol.

9. The secondary battery device (22) as set forth in claim 8 wherein said binder material comprises alkyl glue.

10. The secondary battery device (22) as set forth in claim 8 wherein said binder material comprises acrylic glue.

11. The secondary battery device (22) as set forth in claim 7 wherein said host lattice (44) of said electroactive layer (42) comprises particles of amorphous thermally expandable graphite and manganese dioxide and activated manganese dioxide and acetylene black and a binder material being wettable by glycerol and an electrically conductive paint including graphite.

12. The secondary battery device (22) as set forth in claim 11 wherein said binder material is alkyl glue.

13. The secondary battery device (22) as set forth in claim 11 wherein said binder material is acrylic glue.

14. The secondary battery device (22) as set forth in claim 11 wherein said binder material is an electrically conductive paint including graphite.

15. The secondary battery device (22) as set forth in claim 7 wherein said host lattice (44) of said electroactive layer (42) includes a polyconjugated linear hydrocarbon polymer.

16. The secondary battery device (22) as set forth in claim 7 wherein said host lattice (44) of said electroactive layer (42) includes a cyclic polyconjugated chain polymer of polyaniline.

17. A method for constructing a secondary battery device (22) having an anode (28) and a negative lead (30) and a membrane (34) and an electrolyte (24) and a cathode (38) having a carrier sheet (40) of cellulose using a cathodic mixture, said method comprising;
heating a plate of Aluminum of 99.95% purity and 0.1 wt % to 0.6 wt % of Indium to a temperature of 450° C.,
rolling the plate to reduce the thickness of the plate while cooling at a rate of more than 10° C. per minute to a reduced thickness,
reheating the reduced thickness of the plate and rerolling the reduced thickness of the plate into a foil coated with Aluminum Oxide and surface contaminants and having a thickness between 0.05 mm and 0.1 mm,
rinsing the foil with ethanol to remove surface contaminants therefrom,
submerging the foil in a solution of water and Hydroxide for one minute for removing the Aluminum Oxide from the surface of the foil,
rinsing the foil with water for removing the Hydroxide therefrom,
subjecting the foil to 70° C. for 30 minutes for evaporating moisture therefrom,
surrounding the foil with an anhydrous environment,
dividing the foil into a rectangular shape to define the anode (28) having a first length of 1.2 cm and a first width of 1.7 cm,
attaching a negative lead (30) to the anode (28) with a cement (32) including particles of silver,
wetting the membrane (34) with the electrolyte (24),
stacking the membrane (34) upon and parallel to the anode (28), applying the cathodic mixture in a thin film layer to one side of the carrier sheet (40) of cellulose to soak into the carrier sheet (40), subjecting the cathodic mixture to a temperature of 50° C. to 60° C. to solidify the cathodic mixture into a host lattice (44) being disposed upon and within the carrier sheet (40), wetting the host lattice (44) with a doping fluid containing a dopant (48) to allow the dopant (48) to bond with and intercalate into the host lattice (44) to produce an electroactive layer (42), attaching a positive lead (50) in electrical contact with the electroactive layer (42) of the cathode (38) with an adhesive (52) containing graphite;

stacking the cathode (38) upon and parallel to the membrane (34) with the membrane (34) disposed between the anode (28) and the cathode (38), and characterized by, dissolving Aluminum Perchlorate powder in glycerol to saturation to produce the electrolyte (24), dissolving $AlCl_3$ powder in ethanol to produce a background solution, combining 40 wt % of the background solution with 60 wt % of glycerol to produce a binary solvent, grating 1 cm$^3$ of 99.4 wt % to 99.9 wt % of Aluminum of 99.95% purity and 0.1 wt % to 0.6 wt % of indium to make filings with an equivalent surface area of 20 cm$^2$ to 30 cm$^2$, immersing the filings in 150 ml to 200 ml of the binary solvent until the filings have dissolved to produce the doping fluid.

18. The method as set forth in claim 17 further comprising a step for making the cathodic mixture characterized by;

mixing 5 wt % of alkyl glue with 60 wt % of ethanol with 35 wt % of flakes of graphite to make the cathodic mixture.

19. The method as set forth in claim 17 further comprising a step for making the cathodic mixture characterized by;

mixing amorphous thermally expandable graphite powder with 1-5 wt % $MnO_2$ with 1-5 wt % activated $MnO_2$ with 1-5 wt % acetylene black to make an intermediate mixture.

20. The method as set forth in claim 19, further comprising the step of adding a binder of alkyl glue and ethanol to the intermediate mixture to make the cathodic mixture having a consistency of thick spreadable paste.

21. The method as set forth in claim 19, further comprising the step of adding a binder of acrylic glue to the intermediate mixture to make the cathodic mixture having a consistency of thick spreadable paste.

22. The method as set forth in claim 19, further comprising the step of adding a binder of graphite paint to the intermediate mixture to make the cathodic mixture having a consistency of thick spreadable paste.

\* \* \* \* \*

UNITED STATES PATENT AND TRADEMARK OFFICE
CERTIFICATE OF CORRECTION

PATENT NO. : 9,912,008 B2
APPLICATION NO. : 14/607429
DATED : March 6, 2018
INVENTOR(S) : Alexandre M. Iarochenko Page 1 of 1

It is certified that error appears in the above-identified patent and that said Letters Patent is hereby corrected as shown below:

In the Specification

Column 3, Line 66: "{C3H5(OH)3}3]" should read --{C3H5(OH)2}2]--.

Column 3, Line 67: "Charge" should read --charge--.

Column 4, Lines 51-52: The missing paragraph should read --The method includes steps for constructing the battery device by wetting the membrane 34 with an electrolyte 24, and stacking the membrane 34 upon and parallel to the anode.--.

Column 4, Line 64 through Column 5, Line 8: The second version of the paragraph should be removed as it is a duplicate paragraph.

In the Claims

Column 7, Line 19: Claim 7, "indium" should read --Indium--.

Signed and Sealed this
Seventeenth Day of September, 2019

Andrei Iancu
*Director of the United States Patent and Trademark Office*